United States Patent
Komori et al.

(10) Patent No.: US 9,928,357 B2
(45) Date of Patent: Mar. 27, 2018

(54) INFORMATION PROCESSING APPARATUS, INFORMATION PROCESSING METHOD, PROGRAM, AND INFORMATION PROCESSING SYSTEM

(75) Inventors: Akihiro Komori, Tokyo (JP); Qihong Wang, Tokyo (JP); Tomohisa Tanaka, Tokyo (JP); Tsuyoshi Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 563 days.

(21) Appl. No.: 13/474,333

(22) Filed: May 17, 2012

(65) Prior Publication Data
US 2012/0304268 A1 Nov. 29, 2012

(30) Foreign Application Priority Data
May 25, 2011 (JP) ................................. 2011-116602

(51) Int. Cl.
*G06F 21/00* (2013.01)
*G06F 21/36* (2013.01)

(52) U.S. Cl.
CPC .................................. *G06F 21/36* (2013.01)

(58) Field of Classification Search
CPC ... H04L 63/0869; H04L 9/3273; H04L 63/16; H04L 63/0853; H04L 63/0876; G06F 1/3206; G06F 3/0488; H04M 1/72569; H04M 2250/12; H04W 12/08; H04W 12/06; H04W 12/00

USPC ............ 713/168–170, 153; 726/2–4, 17, 21, 726/27–30; 455/410, 411
See application file for complete search history.

(56) References Cited

U.S. PATENT DOCUMENTS

| | | | |
|---|---|---|---|
| 8,260,261 B2 * | 9/2012 | Teague | 455/411 |
| 8,482,403 B2 * | 7/2013 | Thorn | 340/539.11 |
| 2007/0192849 A1 * | 8/2007 | Golle | G06F 21/34 726/16 |
| 2007/0220255 A1 * | 9/2007 | Igarashi | 713/170 |
| 2008/0195866 A1 * | 8/2008 | Roth et al. | 713/171 |
| 2009/0095812 A1 * | 4/2009 | Brown et al. | 235/380 |
| 2009/0153342 A1 * | 6/2009 | Thorn | 340/669 |
| 2009/0158039 A1 * | 6/2009 | Prasad et al. | 713/168 |
| 2012/0293551 A1 * | 11/2012 | Momeyer et al. | 345/633 |

FOREIGN PATENT DOCUMENTS

| | | |
|---|---|---|
| JP | 4074998 | 2/2008 |
| JP | 4178697 | 9/2008 |

* cited by examiner

*Primary Examiner* — John B King
(74) *Attorney, Agent, or Firm* — Paratus Law Group, PLLC

(57) ABSTRACT

An information processing apparatus includes a communication unit for communicating with another information processing apparatus and a determination unit for determining whether or not to authenticate the other information processing apparatus on the basis of an operation pattern reported to a user and an analysis result of the user's operation corresponding to the operation pattern.

16 Claims, 13 Drawing Sheets

INFORMATION PROCESSING APPARATUS, INFORMATION PROCESSING METHOD, PROGRAM, AND INFORMATION PROCESSING SYSTEM

BACKGROUND

The present disclosure relates to an information processing apparatus, an information processing method, a program, and an information processing system.

When a connection is established between communication terminals, safety or security is secured by a user intervening in a complex operation. For example, the user checks a password to be displayed on a communication terminal of a connection destination and inputs the same password to a communication terminal of a connection source, so that the connection is established between the communication terminals.

In addition, technology as will be described below has been proposed as a method of establishing a connection between communication terminals.

For example, Japanese Patent No. 4178697 discloses an information processing terminal that images visual identification information of a target, identifies the target based on the imaged identification information, and establishes a connection to the identified target.

In addition, in Japanese Patent No. 4074998, a data communication apparatus, which observes a real-world event, compares a real-world event received from another data communication apparatus to the observed real-world event, and receives a file from the other data communication apparatus if the two events are identical.

SUMMARY

However, because the number of characters should be increased to secure the safety or security in a method of allowing a user to input a password as described above, a time-consuming character input operation is necessary.

In addition, an information input/output system described in Japanese Patent No. 4178697 and a data communication system described in Japanese Patent No. 4074998 have problems in safety and security because although no complex operation by a user is necessary because a connection is automatically established on the basis of identification information shared with a communication apparatus at hand, there is no intervention of a visual check or manual input operation.

It is desirable to provide a novel and improved information processing apparatus, information processing method, program, and information processing system, which can enable an authentication process to be performed by an intuitive operation.

According to an embodiment of the present disclosure, there is provided an information processing apparatus including: a communication unit for communicating with another information processing apparatus; and a determination unit for determining whether or not to authenticate the other information processing apparatus on the basis of an operation pattern reported to a user and an analysis result of the user's operation corresponding to the operation pattern.

In addition, according to another embodiment of the present disclosure, there is provided an information processing method including: communicating with another information processing apparatus; and determining whether or not to authenticate the other information processing apparatus on the basis of an operation pattern reported to a user and an analysis result of the user's operation corresponding to the operation pattern.

In addition, according to another embodiment of the present disclosure, there is provided a program for causing a computer to execute the processes of: communicating with another information processing apparatus; and determining whether or not to authenticate the other information processing apparatus on the basis of an operation pattern reported to a user and an analysis result of the user's operation corresponding to the operation pattern.

In addition, according to another embodiment of the present disclosure, there is provided an information processing system including: an information processing apparatus including a communication unit for communicating with the other information processing apparatus; and a determination unit for determining whether or not to authenticate the other information processing apparatus on the basis of an operation pattern reported to a user and an analysis result of the user's operation corresponding to the operation pattern; and the other information processing apparatus including a communication unit for communicating with the information processing apparatus; a sensor for detecting the user operation corresponding to the operation pattern; and an analysis unit for analyzing a detection result of the sensor.

According to the embodiments of the present disclosure described above, an authentication process can be performed by an intuitive operation.

DETAILED DESCRIPTION OF THE EMBODIMENT(S)

Figure 1:
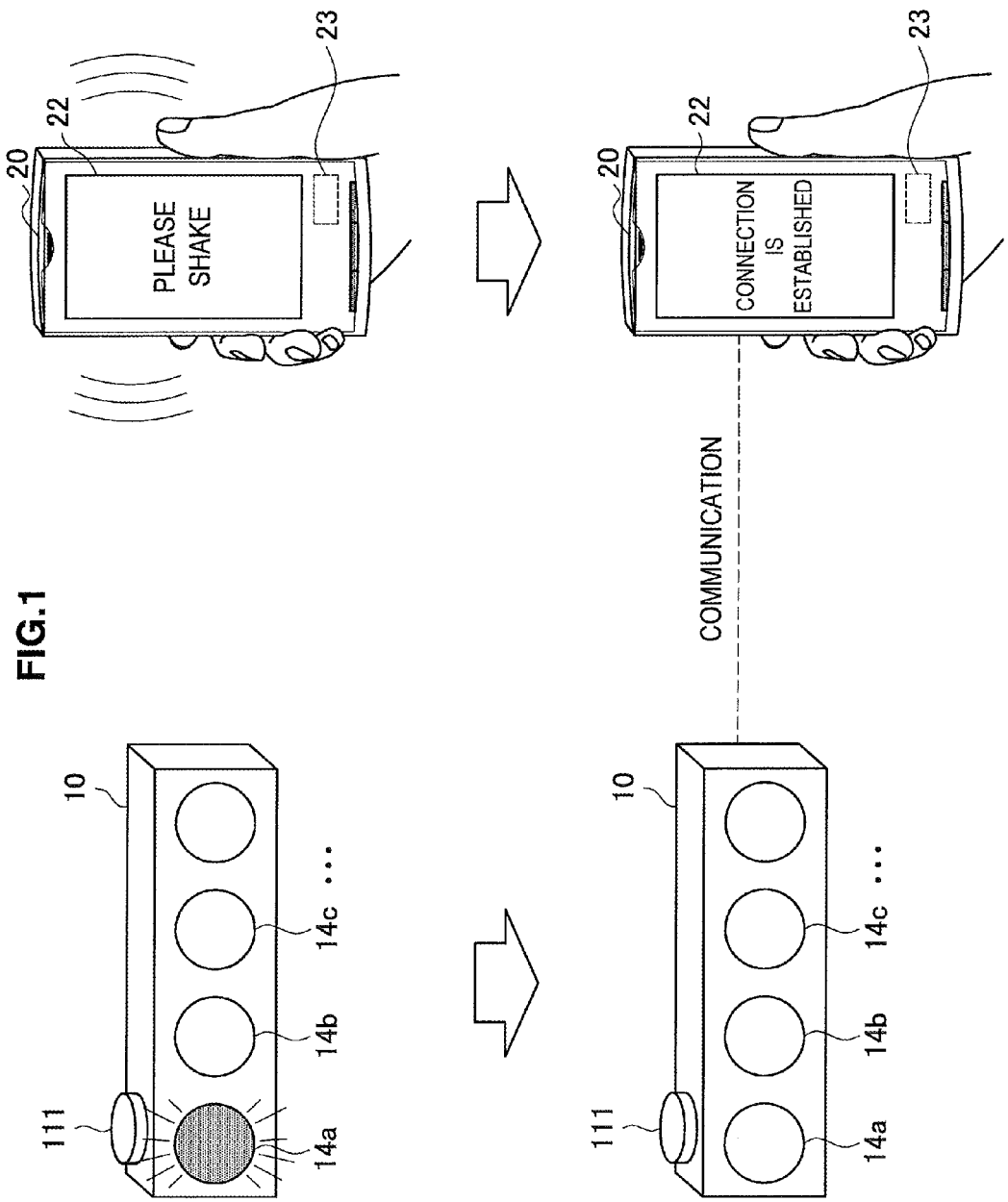
FIG. 1 is a diagram illustrating an overview of an authentication system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be given in the following order.
1. First Embodiment
1-1. Overview of Authentication System
1-2. Configuration of Authentication System
1-3. Operation Process of Authentication System
2. Second Embodiment
3 Summary As will be described in the first and second embodiments of the present disclosure, an information processing apparatus (an access point 10 or a home image display apparatus 30) includes:

A: a communication unit 16 or 36, which communicates with another information processing apparatus; and B: a determination unit 17 or 37, which determines whether or not to authenticate the other information processing apparatus on the basis of an operation pattern reported to a user and an analysis result of the user's operation corresponding to the operation pattern.

1. First Embodiment

[1-1. Overview of Authentication System]

FIG. 1 is a diagram illustrating the overview of the authentication system according to the first embodiment of the present disclosure. As illustrated on the upper side of FIG. 1, the access point 10 and a portable terminal 20 are provided. If the user presses a start button 111, an LED 14 of the access point 10 blinks and an operation pattern is visually reported to the user. Here, the operation pattern is a cycle of the user's operation. For example, if an operation pattern in which the user performs an operation is reported rhythmically twice per second, sequential blinking of LEDs 14 is iterated every 0.5 seconds.

In addition, if the start button 111 is pressed, the access point 10 transmits an authentication start instruction to the portable terminal 20. On the other hand, the portable terminal 20 displays a display indicating the user's operation on a display unit 22 according to the authentication start instruction received from the access point 10.

In addition, the portable terminal 20 has an acceleration sensor 23, which senses the user's operation corresponding to the operation pattern. If the user shakes the portable terminal 20 according to the blinking of the LED 14 of the access point 10, the acceleration sensor 23 senses the vibration of the portable terminal 20.

Next, the access point 10 compares data indicating the vibration sensed by the portable terminal 20 to the operation pattern reported by the blinking of the LED 14. If a comparison result has satisfied a condition, the access point 10 authenticates the portable terminal 20 and establishes communication with the portable terminal 20 as illustrated on the lower side of FIG. 1.

According to the authentication system related to the embodiment of the present disclosure as described above, the authentication process can be performed when the user only performs an intuitive operation according to the reported operation pattern without having to perform a complex password input operation. Hereinafter, detailed configurations of the access point 10 and the portable terminal 20 constituting the authentication system as described above will be described.

[1-2. Configuration of Authentication System]
(Configuration of Access Point 10)

Figure 2:
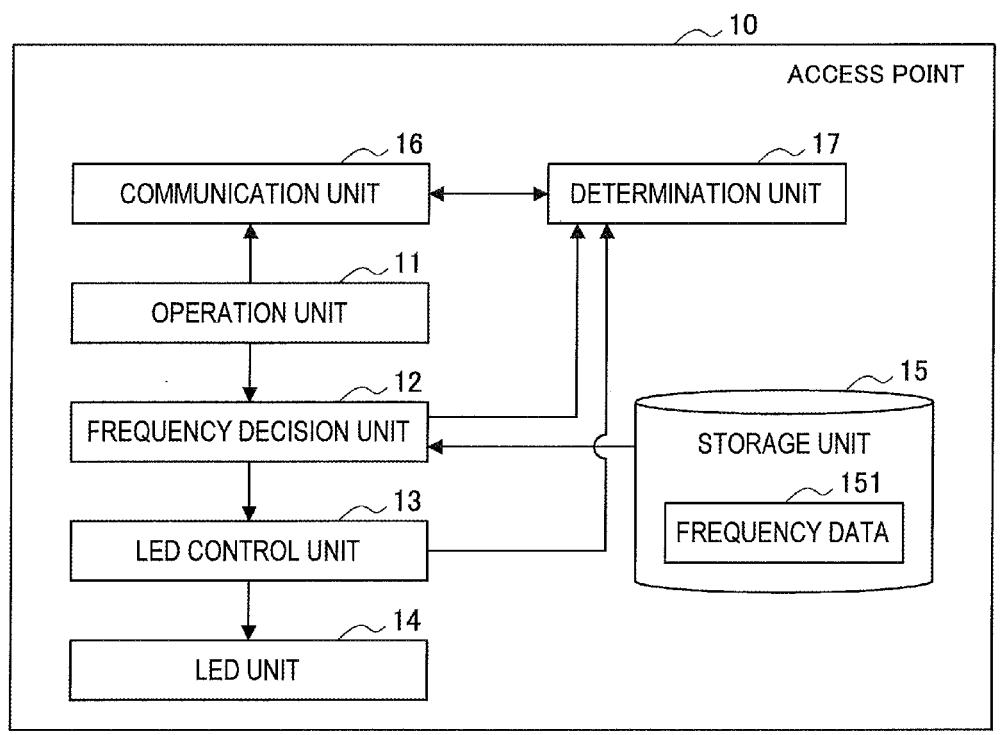
FIG. 2 is a block configuration diagram of an access point according to this embodiment.

The configuration of the access point 10 provided in the authentication system according to this embodiment will be described with reference to FIG. 2. FIG. 2 is a block configuration diagram of the access point 10 according to this embodiment. As illustrated in FIG. 2, the access point 10 includes an operation unit 11, a frequency decision unit 12, an LED control unit 13, an LED unit 14, a storage unit 15, the communication unit 16, and the determination unit 17.

The operation unit 11 is an operation input unit, which receives the user's operation. For example, in addition to the start button 111 illustrated in FIG. 1, the operation unit 11 according to this embodiment may be a switch or a start icon displayed on a touch panel. If the user presses the start button 111, the operation unit 11 outputs an authentication start instruction to the frequency decision unit 12. In addition, the start button 111 may output the authentication start instruction to the communication unit 16.

The frequency decision unit 12 decides a connection permission frequency and a connection permission threshold value (frequency difference) indicating a permissible difference when there is a difference between the connection permission frequency and detected data indicating the user's operation. As illustrated in FIG. 2, the frequency decision unit 12 according to this embodiment extracts frequency data 151 to be used from the storage unit 15, and decides the use of a connection permission frequency and a connection permission threshold value included in the frequency data 151. A connection permission frequency decision method of the frequency decision unit 12 is not limited to the example illustrated in FIG. 2. For example, the frequency decision unit 12 may generate and decide the connection permission frequency and the connection permission threshold value. In this case, the frequency decision unit 12 outputs the generated connection permission frequency and connection permission threshold value to the storage unit 15, and stores the connection permission frequency and connection permission threshold value in the storage unit 15. In addition, the frequency decision unit 12 outputs the decided connection permission frequency to the LED control unit 13.

The LED control unit 13 is a light emission control unit, which controls the light emission of the LED 14. More specifically, the LED control unit 13 according to this embodiment sets an LED blinking cycle based on the connection permission frequency output from the frequency decision unit 12. Specifically, the LED control unit 13 sets the LED blinking cycle so that the rhythm of the operation pattern indicated by the connection permission frequency is implemented by the blinking of the LED. For example, if the connection permission frequency is 2 Hz, the LED control unit 13 sets the LED blinking cycle to 2 Hz so that the LEDs 14 sequentially blink at intervals of 0.5 sec.

The LED 14 is an output unit, which reports an operation pattern to the user. As illustrated in FIG. 1, the LEDs 14 according to this embodiment include LEDs 14a, 14b, 14c, and 14d. The LEDs 14 may emit light, for example, in different colors of blue, red, green, and purple. In addition, each LED 14 blinks according to the LED blinking cycle from the LED control unit 13, thereby reporting the operation pattern to the user.

Although the four LEDs 14 are used as the output unit as illustrated in FIGS. 1 and 2 in this embodiment, the number of LEDs 14 may be, for example, one as well as four. In addition, the output unit may be an image display apparatus or an audio output apparatus in addition to a light emitting apparatus represented by the LED. For example, the image display apparatus reports the operation pattern to the user by displaying a light emission video of an LED, the motion of a needle of a clock, and the motion of a spring with a weight, or an image of a message, "Please shake the portable terminal vigorously from side to side every one second."

The storage unit 15 is a storage medium, which stores programs to be executed by a central processing unit (CPU) or various data. In addition, the storage unit 15 according to this embodiment stores the frequency data 151 including the connection permission frequency and the connection permission threshold value.

The communication unit 16 is a communication device, which transmits/receives data to/from the portable terminal 20. The communication unit 16 according to this embodiment performs, for example, wireless communication of Wi-Fi, Bluetooth, or the like. In addition, if an authentication start instruction is input from the operation unit 11, the communication unit 16 according to this embodiment may transmit the authentication start instruction to the portable terminal 20 detected in a range in which Wi-Fi communication is possible in a broadcast or unicast mode. In addition, the communication unit 16 receives an analysis result of the user's operation from the portable terminal 20. Further, the communication unit 16 controls communication with the portable terminal 20 according to a determination result input from the determination unit 17.

The determination unit 17 determines whether or not to authenticate another information processing apparatus on the basis of the operation pattern reported to the user and the analysis result of the user's operation corresponding to the above-described operation pattern. Specifically, the determination unit 17 compares an FFT result indicating the user's operation received by the communication unit 16 from the portable terminal 20 to the LED blinking cycle based on the connection permission frequency, and permits the authentication if a comparison result is within the connection permission threshold value. In addition, the determination unit 17 outputs a determination result indicating the permission or rejection of the authentication to the communication unit 16.

The configuration of the access point 10 according to the embodiment of the present disclosure has been described above. Next, the configuration of the portable terminal 20 will be described with reference to FIG. 3.

(Configuration of Portable Terminal 20)

Figure 3:
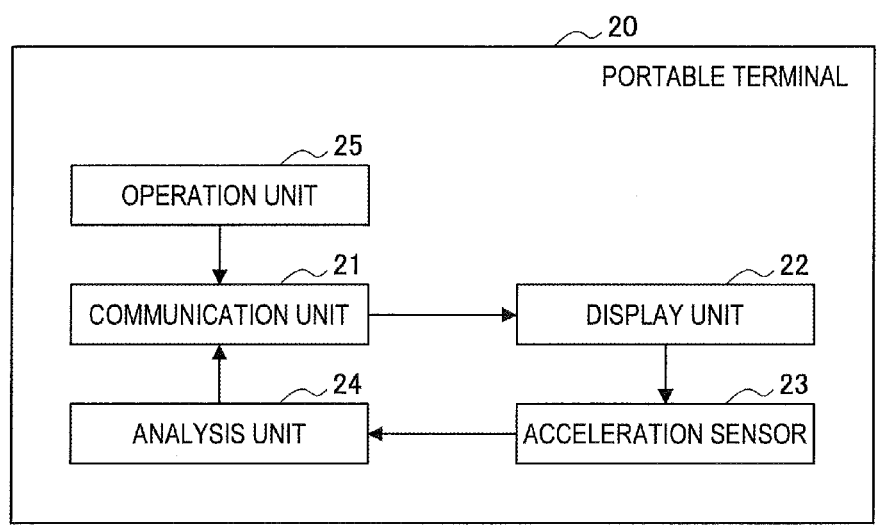
FIG. 3 is a block configuration diagram of a portable terminal according to this embodiment.

FIG. 3 is a block configuration diagram of the portable terminal 20 according to this embodiment. As illustrated in FIG. 2, the portable terminal 20 includes a communication unit 21, a display unit 22, an operation unit 25, an acceleration sensor 23, and an analysis unit 24.

The communication unit 21 is a communication device, which transmits/receives data to/from the access point 10. The communication unit 21 performs, for example, wireless communication of Wi-Fi, Bluetooth, or the like. When the authentication start instruction has been received from the access point 10, the communication unit 21 according to this embodiment outputs the authentication start instruction to the display unit 22. In addition, the communication unit 21 according to this embodiment transmits the analysis result output from the analysis unit 24 to the access point 10.

The display unit 22 displays a display screen for guiding the user to perform an operation. The display unit 22 is implemented, for example, by a cathode ray tube (CRT) display apparatus, a liquid crystal display (LCD) apparatus, or an organic light emitting diode (OLED) apparatus. In addition, if the authentication start instruction is received from the communication unit 21, the display unit 22 according to this embodiment displays the fact that an authentication process has been started or an image of an instruction to shake the terminal according to the turn-on of the LED 14.

The operation unit 25 detects the operation by the user. A function as the operation unit is implemented, for example, by a touch panel or button.

The acceleration sensor 23 has a function of detecting acceleration along each of three axes as a voltage value. The acceleration sensor 23 has a time resolution of about 1 to 30 Hz and an amplitude resolution of about 1 to 1000 mm. For example, the acceleration sensor 23 detects the acceleration in a sampling cycle of 40 Hz. In addition, the acceleration sensor 23 inputs data indicating the detected acceleration to the analysis unit 24. The acceleration sensor 23 is an example of a sensor that detects the user's operation. The sensor, which detects the user's operation, may be a gyro sensor, a microphone, or a camera.

The analysis unit 24 analyzes data indicating the acceleration input from the acceleration sensor 23, and outputs an analysis result to the communication unit 21. The analysis unit 24 according to this embodiment analyzes data indicating acceleration by an FFT.

The configuration of the portable terminal 20 according to the embodiment of the present disclosure has been described above. Next, an operation process of the authentication system according to the embodiment of the present disclosure will be described with reference to FIG. 4.

[1-3. Operation Process of Authentication System]

Figure 4:
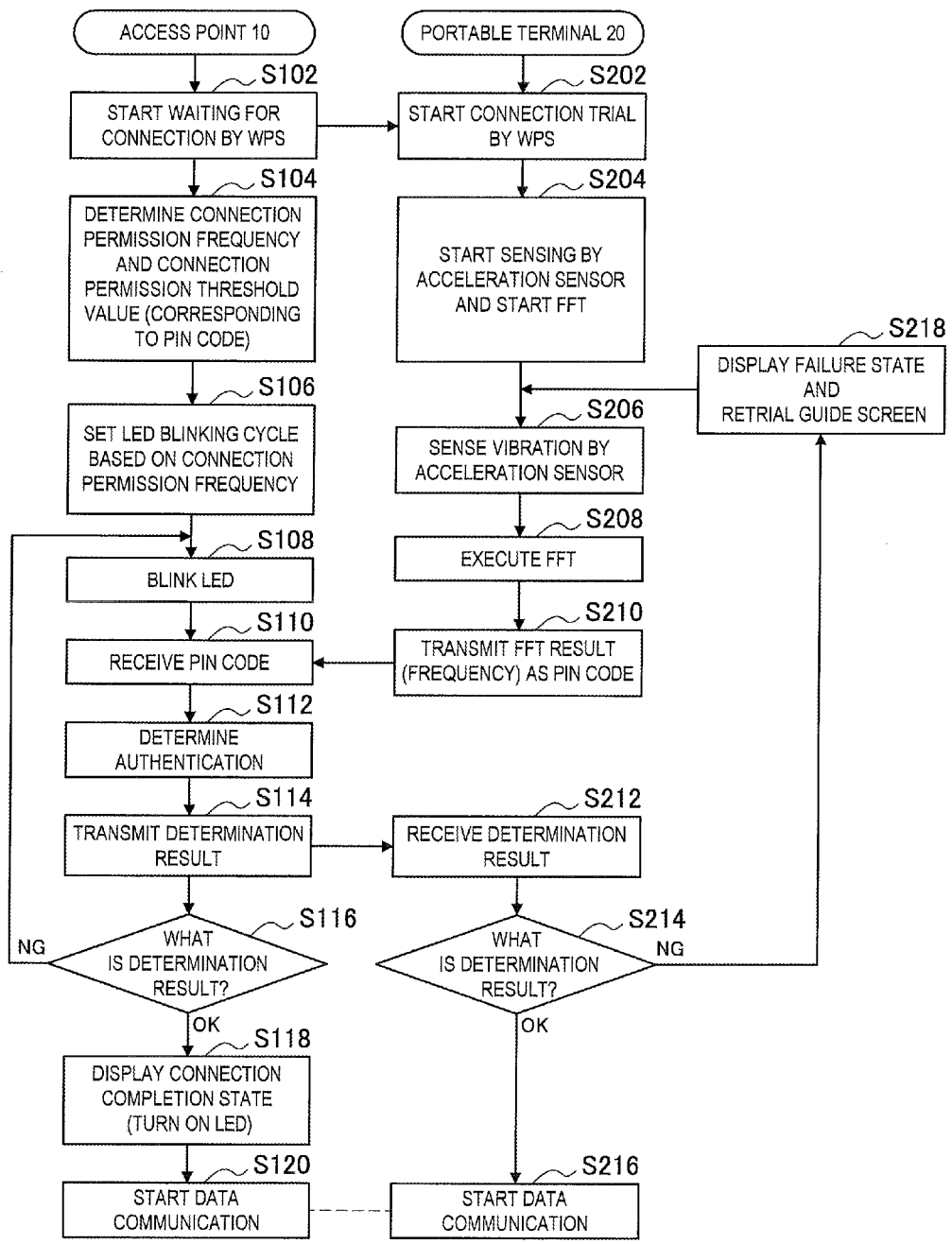
FIG. 4 is a flowchart illustrating an authentication process according to this embodiment.

FIG. 4 is a flowchart illustrating an authentication process according to an embodiment of the present disclosure. As illustrated in FIG. 4, in step S102, the access point 10 starts waiting for a connection by Wi-Fi protected setup (WPS). The waiting for the connection starts when the start button 111 has been pressed as a trigger. In addition, if the waiting for the connection starts, the access point 10 instructs the portable terminal 20 to start the authentication of a communication connection. Specifically, for example, the access point 10 transmits an authentication start instruction to the portable terminal 20 detected in a range in which Wi-Fi communication is possible.

Subsequently, in step S104, the frequency decision unit 12 of the access point 10 decides a connection permission frequency and a connection permission threshold value. The connection permission frequency and the connection permission threshold value correspond to a personal identification number (PIN) code. Next, in step S106, the LED control unit 13 of the access point 10 sets an LED blinking cycle based on the connection permission frequency.

Figure 5:
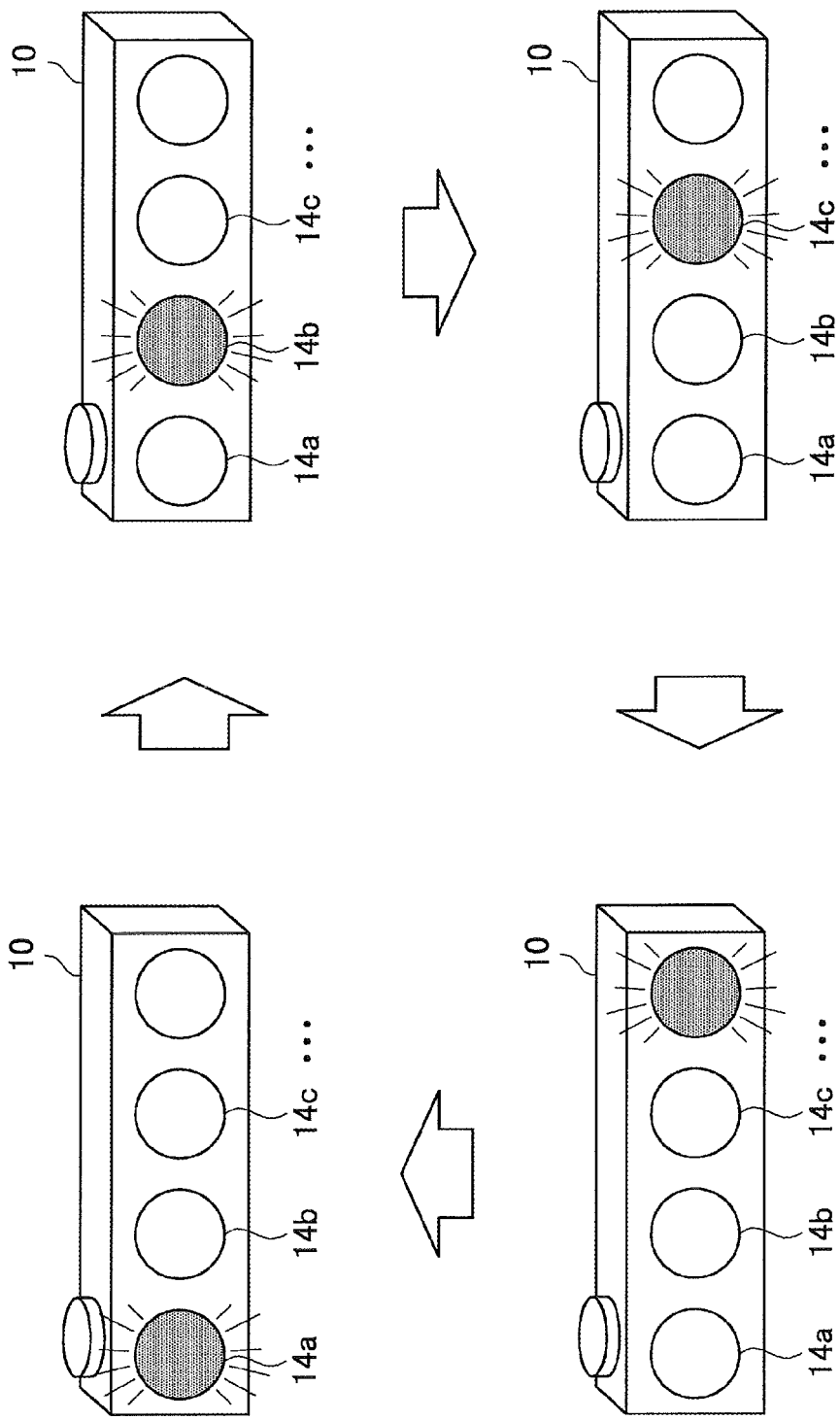
FIG. 5 is a diagram illustrating an example of blinking of a light emitting diode (LED) according to this embodiment.

Subsequently, in step S108, the LED control unit 13 causes the LED 14 to blink according to the set LED blinking cycle. The blinking of the LED 14 will be described with reference to FIG. 5. FIG. 5 is a diagram illustrating an example of blinking of the LED 14 according to this embodiment. As illustrated in FIG. 5, the LEDs 14a to 14d provided in the access point 10 according to this embodiment sequentially blink according to the LED blinking cycle.

On the other hand, in step S202, the portable terminal 20 starts waiting for a connection by WPS when receiving the authentication start instruction from the access point 10.

Figure 6:
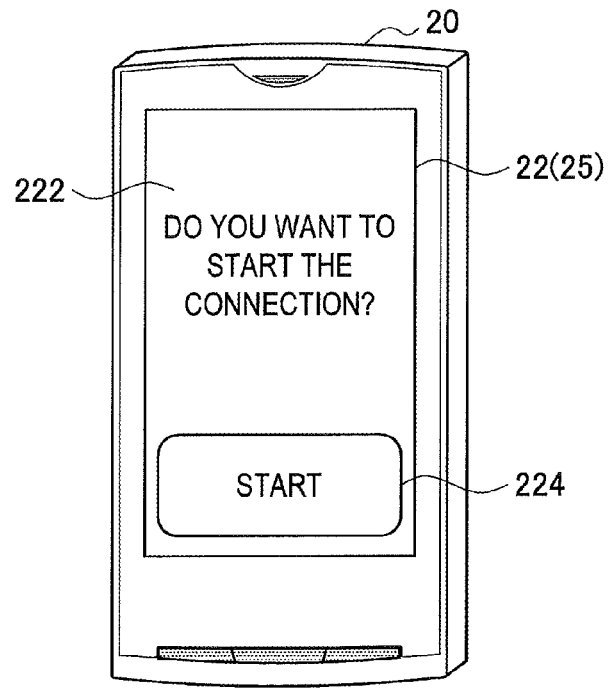
FIG. 6 is a diagram illustrating a screen display example of the portable terminal during a connection start.

As described above, in this embodiment, the authentication start instruction is transmitted from the access point 10 and the authentication process is started. Here, a method of starting the authentication in the authentication system according to the embodiment of the present disclosure is not limited thereto, and the authentication start instruction may be transmitted from the portable terminal 20. The case in which the authentication start instruction is transmitted from the portable terminal 20 will be described with reference to FIG. 6. FIG. 6 is a diagram illustrating a screen display example of the portable terminal 20 during a connection start. As illustrated in FIG. 6, the portable terminal 20 displays a display 222, "Do you want to establish the connection?" and a start icon 224 on the display unit 22. Here, because the display unit 22 is a touch panel integrated with the operation unit 25, the operation unit 25 detects a connection start operation if the user touches the start icon 224. The portable terminal 20 starts waiting for a connection using the connection start operation performed by the user as a trigger, and transmits the authentication start instruction to the access point 10, for example, detected in a range in which Wi-Fi communication is possible.

Figure 7:
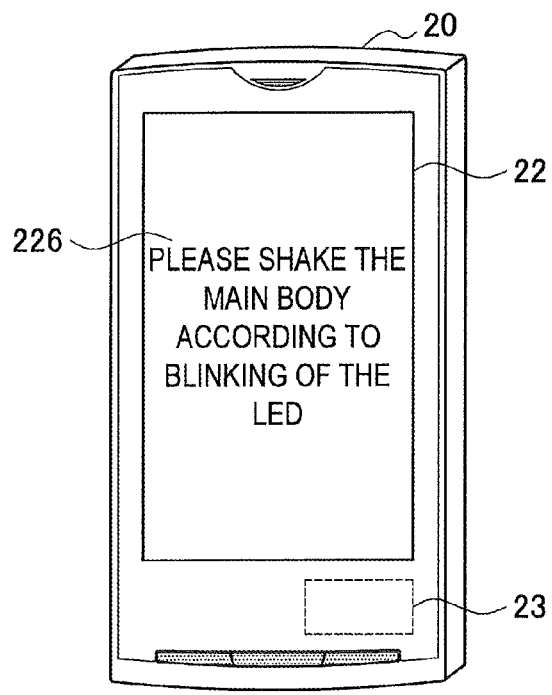
FIG. 7 is a diagram illustrating a screen display example of the portable terminal during operation guidance.

Subsequently, in step S204, the portable terminal 20 starts sensing by the acceleration sensor 23 and an FFT by the analysis unit 24. In addition, at this time, the portable terminal 20 may display a display for guiding the user to perform an operation on the display unit 22. A guide display will be described with reference to FIG. 7. FIG. 7 is a diagram illustrating a screen display example of the portable terminal 20 during operation guidance. As illustrated in FIG. 7, the display unit 22 displays a display 226, "Please shake the main body according to blinking of the LED."

Figure 8:
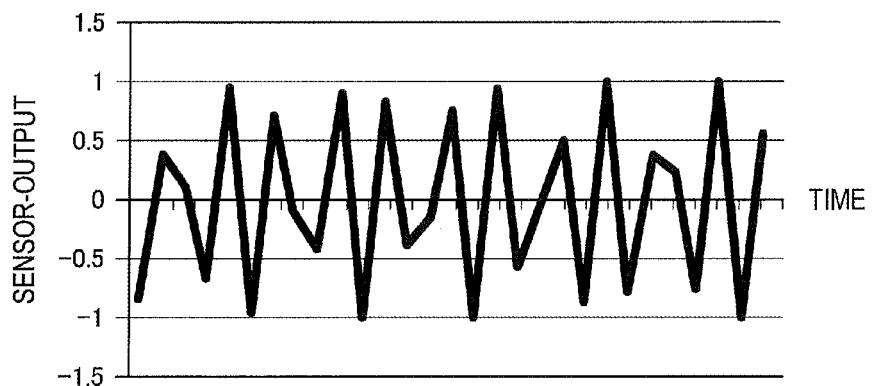
FIG. 8 is a diagram illustrating an example of data detected by an acceleration sensor according to this embodiment.

Next, in step S206, the acceleration sensor 23 detects the vibration of the portable terminal 20 as data indicating acceleration if the user shakes the portable terminal 20 according to the blinking of the LED 14. Here, an example of data detected by the acceleration sensor is illustrated in FIG. 8. As illustrated in FIG. 8, the acceleration sensor 23 inputs an output value detected by the sensor for each time to the analysis unit 24 as data indicating acceleration.

Figure 9:
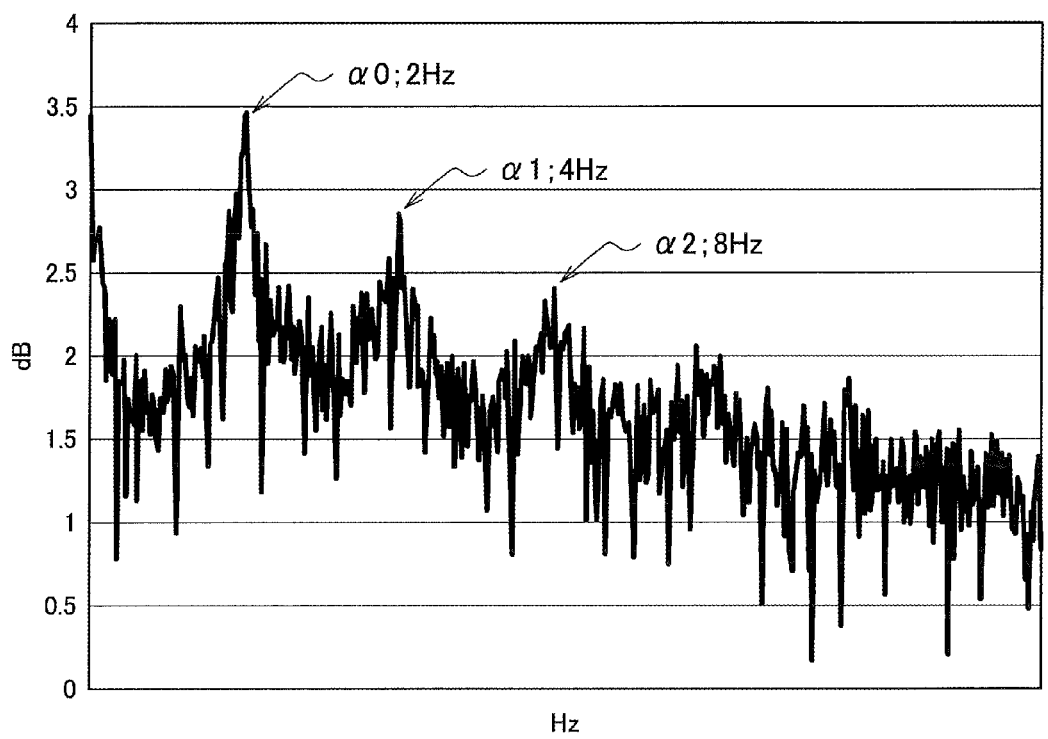
FIG. 9 is a diagram illustrating an example of a frequency after an analysis unit performs a fast Fourier transform (FFT) on data input from the acceleration sensor according to this embodiment.

Subsequently, in step S208, the analysis unit 24 analyzes the data indicating the acceleration detected by the acceleration sensor 23 according to the FFT. In step S210, the analysis unit 24 transmits an FFT result to the access point 10 as a PIN code. Here, an example of the FFT result transmitted by the analysis unit 24 will be described with reference to FIG. 9. FIG. 9 is a diagram illustrating an example of a frequency after the analysis unit 24 performs the FFT on data input from the acceleration sensor 23. Here, FIG. 9 illustrates a power spectrum obtained by performing the FFT on the data indicating the acceleration when the user shakes a hand in a state in which the portable terminal 20 is held by hand if the LED 14 blinks in a cycle set on the basis of a connection permission frequency of 2 Hz. If the power spectrum illustrated in FIG. 9 is obtained, the analysis unit 24 outputs "α0; 2 Hz," "α1; 4 Hz," and "α2; 8 Hz" as FFT results in descending order of frequency at which a peak arises.

Next, in step S110, the access point 10 receives the FFT result (α0, α1, or α2) indicating the user's operation transmitted from the portable terminal 20 as the PIN code.

Subsequently, in step S112, the determination unit 17 of the access point 10 compares the received FFT result to the LED blinking cycle based on the connection permission frequency, and permits the authentication if a comparison result is within the connection permission threshold value.

The determination unit 17 makes an authentication determination, for example, as follows.

---

FFT result: α Hz
LED blinking cycle: β Hz
Connection permission threshold value (frequency difference): γ Hz
FOR n=A; n≤B; n++
  IF $|\alpha-2^n\cdot\beta|\leq\gamma$
    Connection permission
  ELSE
    Connection rejection
  END
END

---

Here, A≤B, and A and B are integers. For example, A=−1 and B=2. In addition, a loop is provided because of correspondence to a harmonic component. As described above, the determination unit 17 outputs a determination result indicating the connection permission if any one of α0 to α2 can be determined to be the connection permission by determining the FFT result.

Next, in step S114, the access point 10 transmits the determination result to the portable terminal 20. If the determination result is "Authentication NG" in step S116, the process returns to step S108. On the other hand, if the determination result is "Authentication OK" in step S116, the process proceeds to step S118.

Subsequently, in step S118, the access point 10 indicates a connection completion state. For example, the connection completion is indicated by maintaining the LED 14 in the turn-on state. Subsequently, in step S120, the access point 10 starts data communication with the portable terminal 20.

Figure 10:
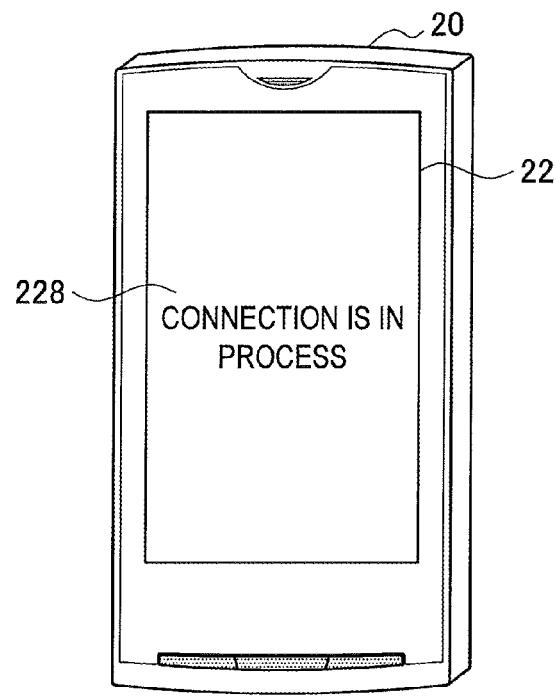
FIG. 10 is a diagram illustrating a screen display example of the portable terminal during a waiting state for a result.

On the other hand, in step S212, the portable terminal 20 is in a waiting state for a result until the determination result is received from the access point 10. Here, FIG. 10 illustrates a screen display example of the portable terminal 20 during the waiting state for the result. As illustrated in FIG. 10, the display unit 22 displays a display 228, "Connection is in process."

Figure 11:
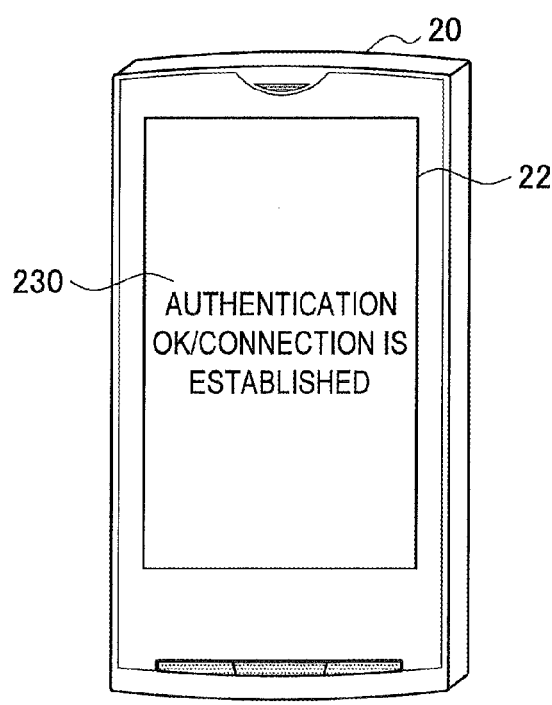
FIG. 11 is a diagram illustrating a screen display example of the portable terminal in the case of "Authentication OK"

Subsequently, if the received determination result is "Authentication OK" in step S214, the process proceeds to step S216. Next, in step S216, the portable terminal 20 starts data communication with the access point 10. At this time, the portable terminal 20 displays a screen corresponding to the determination result. Here, FIG. 11 is a diagram illustrating a screen display example of the portable terminal 20 in the case of "Authentication OK." As illustrated in FIG. 11, the display unit 22 reports the determination result to the user by displaying a display 230, "Authentication OK/Connection is established."

On the other hand, if the received determination result is "Authentication NG" in step S214, the process proceeds to step S218. Next, in step S218, the portable terminal 20 reports a connection failure state and a connection retrial guide to the user. Subsequently, the process proceeds to step S206.

Figure 12:
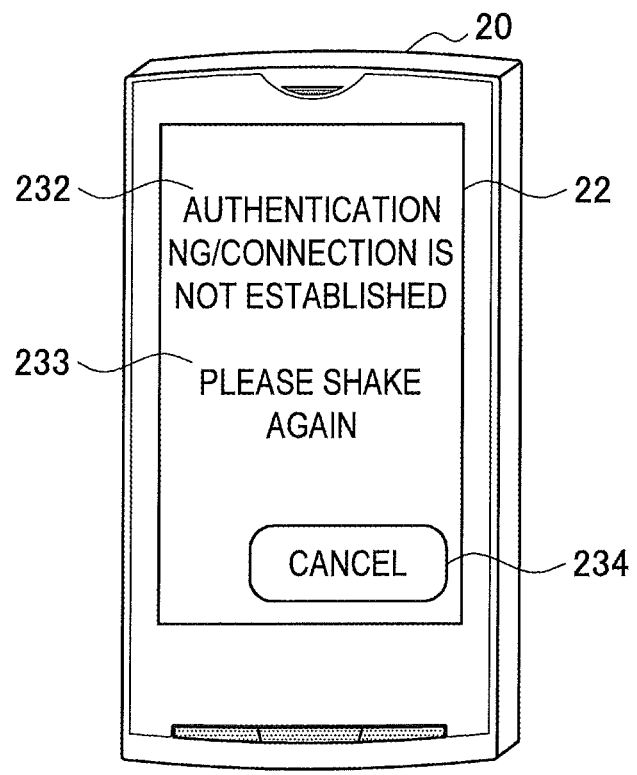
FIG. 12 is a diagram illustrating a screen display example of the portable terminal in the case of "Authentication NG"

Here, a screen display example of the portable terminal 20 in the case of "Authentication NG" is illustrated in FIG. 12. As illustrated in FIG. 12, the display unit 22 shows a display 232 indicating a failure state, "Authentication NG/Connection is not established," a display 233 for retrial guidance, "Please shake again," and a cancel icon 234. According to the display 233 for the retrial guidance, the user retries performance of the connection process by shaking the portable terminal again. The display 233 for the retrial guidance may be displayed along with a specific suggestion such as "Please vertically shake the portable terminal vigorously when the LED is on." When the user has input a cancel operation such as when the cancel icon 234 has been selected, the process ends.

The operation process of the authentication system according to the embodiment of the present disclosure has been described above. According to the authentication system of this embodiment, a complex operation such as a password input is unnecessary and the authentication process can be performed by an intuitive operation. The authentication system according to the embodiment of the present disclosure is not limited to authentication when communication between the access point 10 and the portable terminal 20 is continued as described above, and may be, for example, an embodiment as will be described below. Hereinafter, the second embodiment will be described with reference to FIGS. 13 to 16.

2. Second Embodiment

[2-1. Overview]

Figure 13:
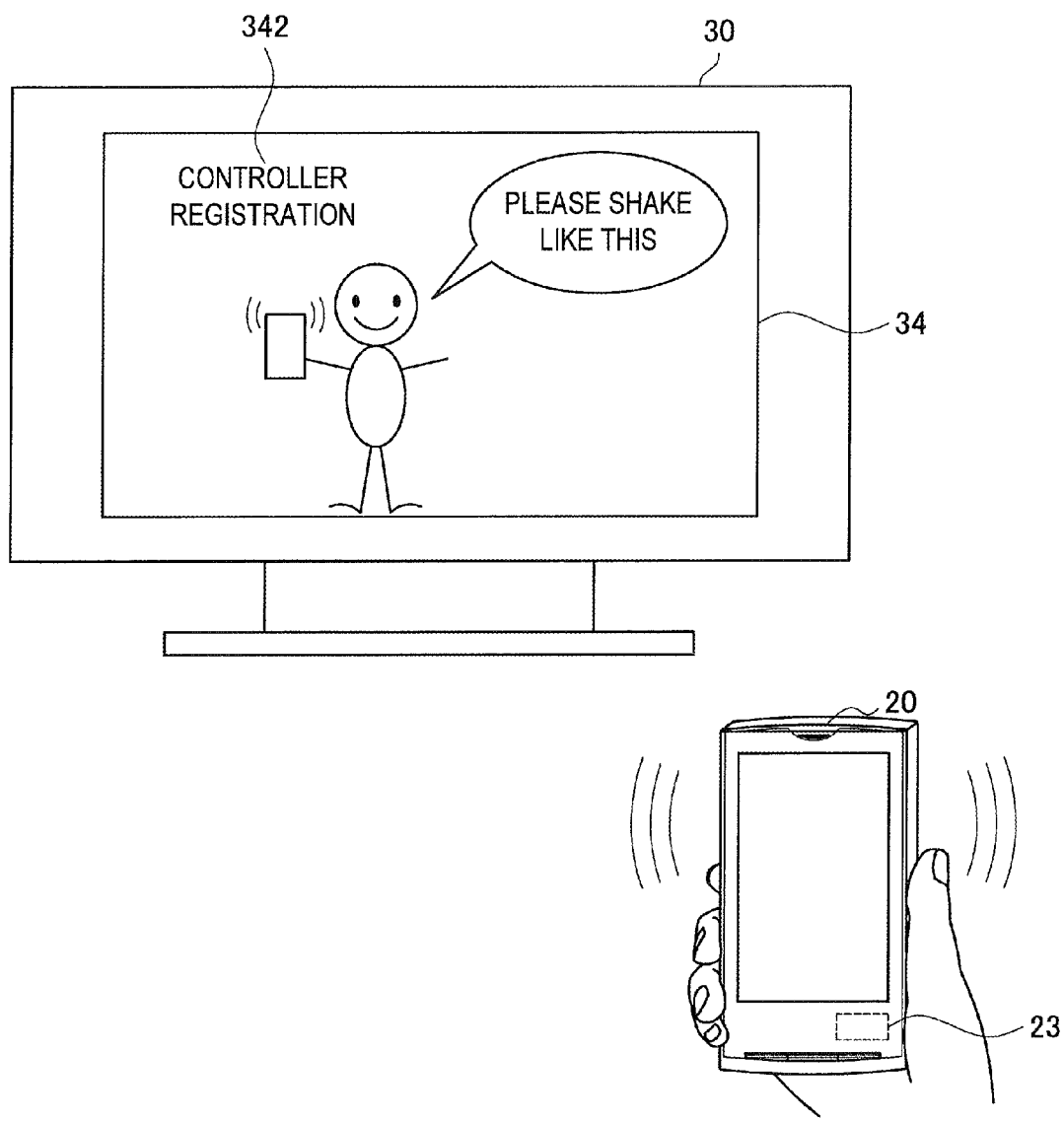
FIG. 13 is a diagram illustrating an overview of an authentication system according to a second embodiment of the present disclosure.

FIG. 13 is a diagram illustrating an overview of an authentication system according to the second embodiment. As illustrated in FIG. 13, a home image display apparatus 30 and a portable terminal 20 are provided. When the two perform direct communication, the user causes communication of the portable terminal 20 with the home image display apparatus 30 to be established by shaking the portable terminal 20 according to a moving image of an instructor displayed on the display unit 32 of the home image display apparatus 30. Thereby, for example, the portable terminal 20 can be registered as a controller of the home image display apparatus 30. Although the portable terminal can be pre-registered in the home image display apparatus 30 at the time of initial setting if it is a portable terminal of an owner user, it is time consuming for the user to perform a complex operation as at the time of initial setting when a portable terminal of a friend user is registered as a controller therein. According to the authentication system of this embodiment, it is possible to perform authentication according to an intuitive operation and establish communication.

[2-2. Configuration]

Figure 14:
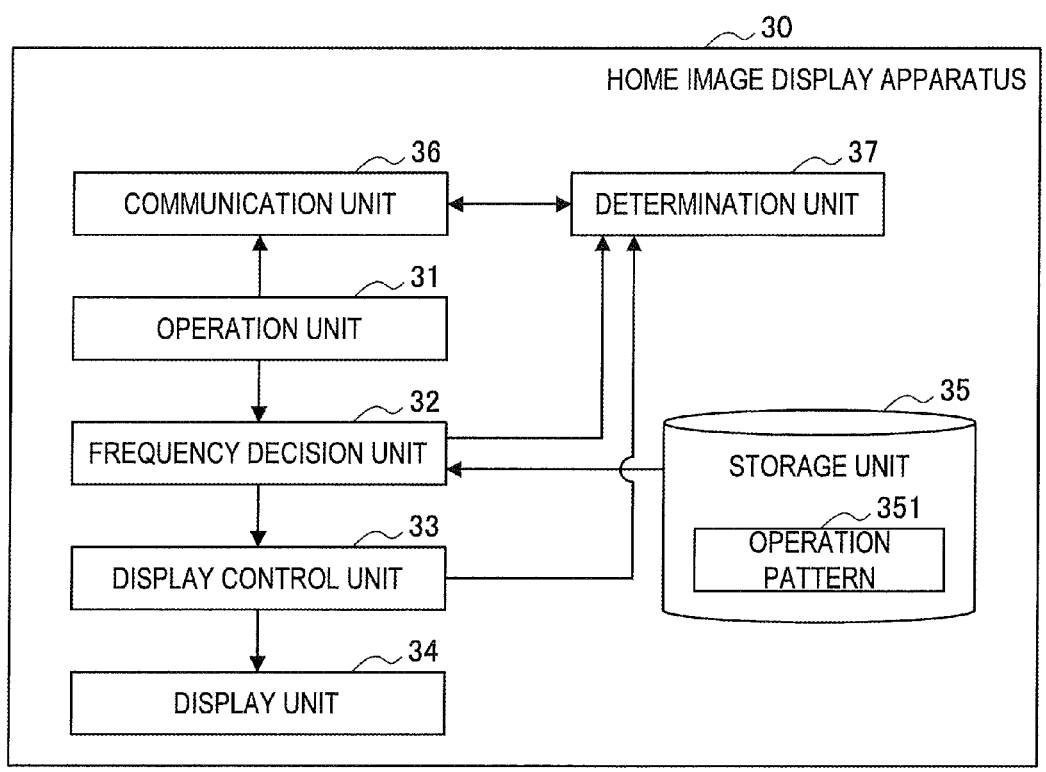
FIG. 14 is a block configuration diagram of a home image display apparatus 30.

In the second embodiment of the present disclosure, the information processing apparatus is implemented by the home image display apparatus 30. Here, a block configuration example of the home image display apparatus 30 is illustrated in FIG. 14. As illustrated in FIG. 14, the home image display apparatus 30 includes an operation unit 31, a frequency decision unit 32, a display control unit 33, a display unit 34, a storage unit 35, the communication unit 36, and the determination unit 37.

The display control unit 33 generates an image to be displayed on the display unit 34 or performs display control. In addition, the display control unit 33 according to this embodiment sets an operation cycle on the basis of a connection permission frequency decided by the frequency decision unit 32, and performs display control corresponding to the set operation cycle. For example, the display control unit 33 generates an image (animation) in which an instructor shakes the portable terminal, and reproduces the image in loop according to the set operation cycle. For example, if the connection permission frequency is 2 Hz, the display control unit 33 sets the operation cycle to 2 Hz so that the image in which the instructor shakes the portable terminal is reproduced in loop at intervals of 0.5 sec.

The display unit 34 displays a display screen for guiding the user to perform an operation. For example, the display unit 34 is implemented by a cathode ray tube (CRT) display apparatus, an liquid crystal display (LCD) apparatus, or an organic light emitting diode (OLED) apparatus. In addition, the display unit 34 according to this embodiment displays an image in which an operation pattern is reported to the user.

The communication unit 36 is a communication device, which transmits/receives data to/from the communication terminal 20. The communication unit 36 performs, for example, wireless communication of Wi-Fi, Wi-Fi Direct, or Bluetooth. Wi-Fi Direct is a standard in which the home image display apparatus 30 can directly communicate with the portable terminal 20 without involving the access point. In addition, the communication unit 36 according to this embodiment receives an analysis result of the user's operation from the portable terminal 20. In addition, the communication unit 36 controls communication with the portable terminal 20 according to a determination result acquired from the determination unit 37. In addition, if an authentication start instruction has been output from the operation unit 31, the communication unit 36 may transmit the authentication start instruction to the portable terminal 20, for example, detected in a range in which Wi-Fi communication is possible.

Because other elements have been described with reference to FIG. 2, description thereof is omitted here.

The configuration of the authentication system according to this embodiment has been described above. Next, an operation process of the authentication system according to the second embodiment will be described with reference to FIG. 15.

[2-3. Operation Process]

Figure 15:
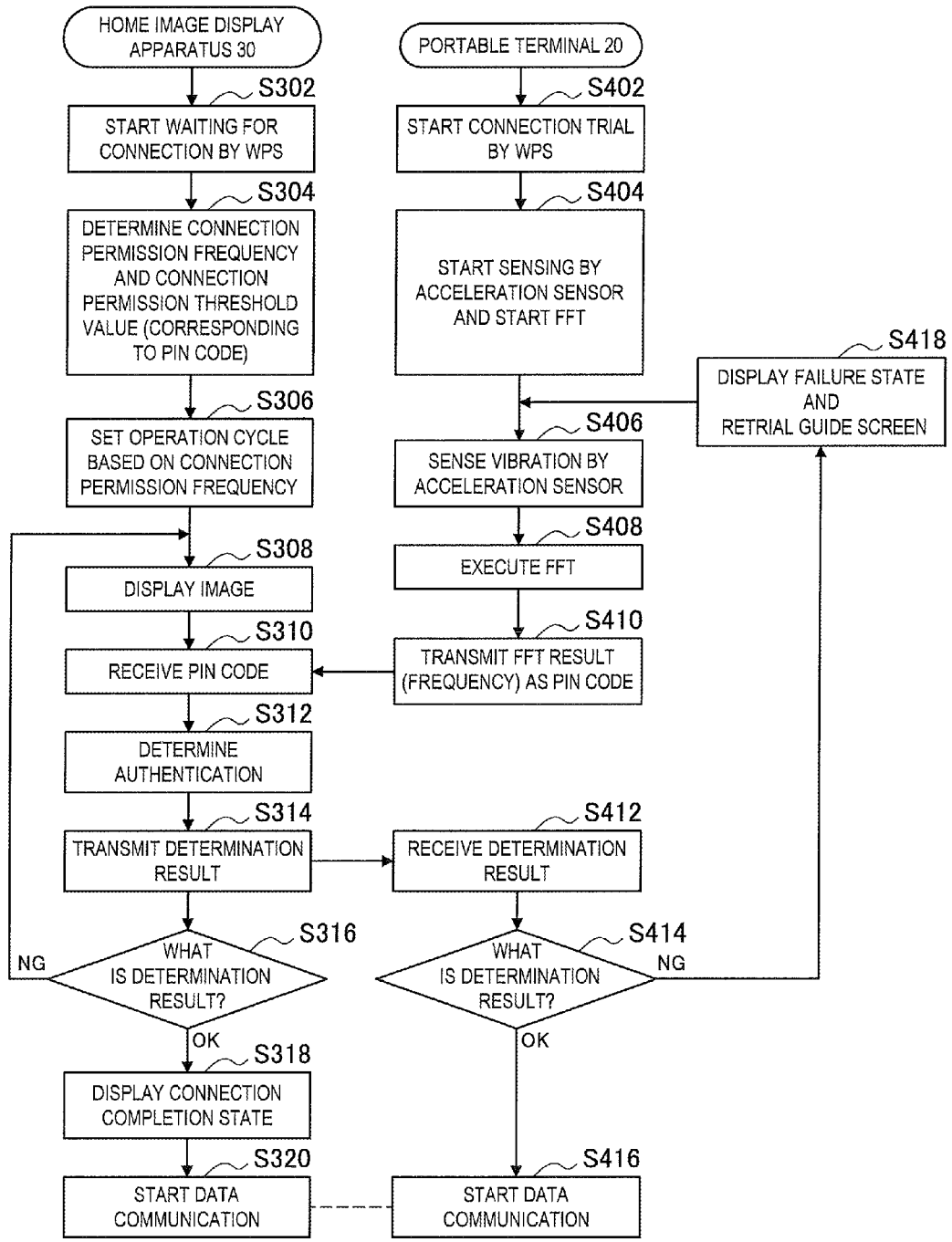
FIG. 15 is a flowchart illustrating an operation process of the authentication system according to the second embodiment.

FIG. 15 is a flowchart illustrating an operation process of the authentication system according to the second embodiment. As illustrated in FIG. 15, first, in step S302, the home image display apparatus 30 starts waiting for a connection by WPS, and transmits an authentication start instruction to the portable terminal 20. Specifically, the home image display apparatus 30 starts waiting for the connection using a communication connection start operation by the user as a trigger, and transmits the authentication start instruction for starting the authentication of the communication connection. The home image display apparatus 30 transmits the authentication start instruction to the portable terminal 20, for example, detected in a range in which Wi-Fi Direct communication is possible.

Subsequently, in step S304, the frequency decision unit 32 of the home image display apparatus 30 decides a connection permission frequency and a connection permission threshold value. The connection permission frequency and the connection permission threshold value correspond to a PIN code. Because the home image display apparatus 30 according to this embodiment can directly communicate with the portable terminal 20 without involving the access point according to Wi-Fi Direct as described above, the home image display apparatus 30, which is a device of a waiting side, can set the PIN code.

Next, in step S306, the display control unit 33 of the home image display apparatus 30 sets an operation cycle based on the connection permission frequency.

Subsequently, in step S308, the display control unit 33 causes the display unit 34 to display a cyclic operation image according to the set operation cycle. For example, the display control unit 33 displays an image in which an instructor holds and shakes the portable terminal in loop according to the operation cycle along with a directive, "Please shake like this," as in an image 342 illustrated in FIG. 13.

On the other hand, in step S402, the portable terminal 20 starts waiting for a connection by WPS when receiving the authentication start instruction from the home image display apparatus 30.

Subsequently, in step S404, the portable terminal 20 starts sensing by the acceleration sensor 23 and an FFT by the analysis unit 24. In addition, at this time, the portable terminal 20 may display a display for guiding the user to perform an operation on the display unit 22. For example, the display unit 22 displays "Please shake the main body according to the motion of the instructor."

Next, in step S406, the acceleration sensor 23 detects the vibration of the portable terminal 20 as data indicating acceleration if the user shakes the portable terminal 20 according to the motion of the instructor.

Subsequently, in step S408, the analysis unit 24 analyzes the data indicating the acceleration detected by the acceleration sensor 23 according to the FFT. In step S410, the analysis unit 24 transmits an FFT result to the home image display apparatus 30 as a PIN code.

Next, in step S310 the home image display apparatus 30 receives the FFT result transmitted from the portable terminal 20 as the PIN code. Subsequently, in step S312, the determination unit 37 of the home image display apparatus 30 compares the received FFT result to an operation cycle based on the connection permission frequency, and permits authentication if a comparison result is within the connection permission threshold value.

Next, in step S314, the home image display apparatus 30 transmits the determination result to the portable terminal 20. If the determination result is "Authentication NG" in step S316, the process returns to step S308. The process of steps S308 to S314 is iterated until the connection is completed or the user cancels the connection. On the other hand, if the determination result is "Authentication OK" in step S316, the process proceeds to step S318.

Figure 16:
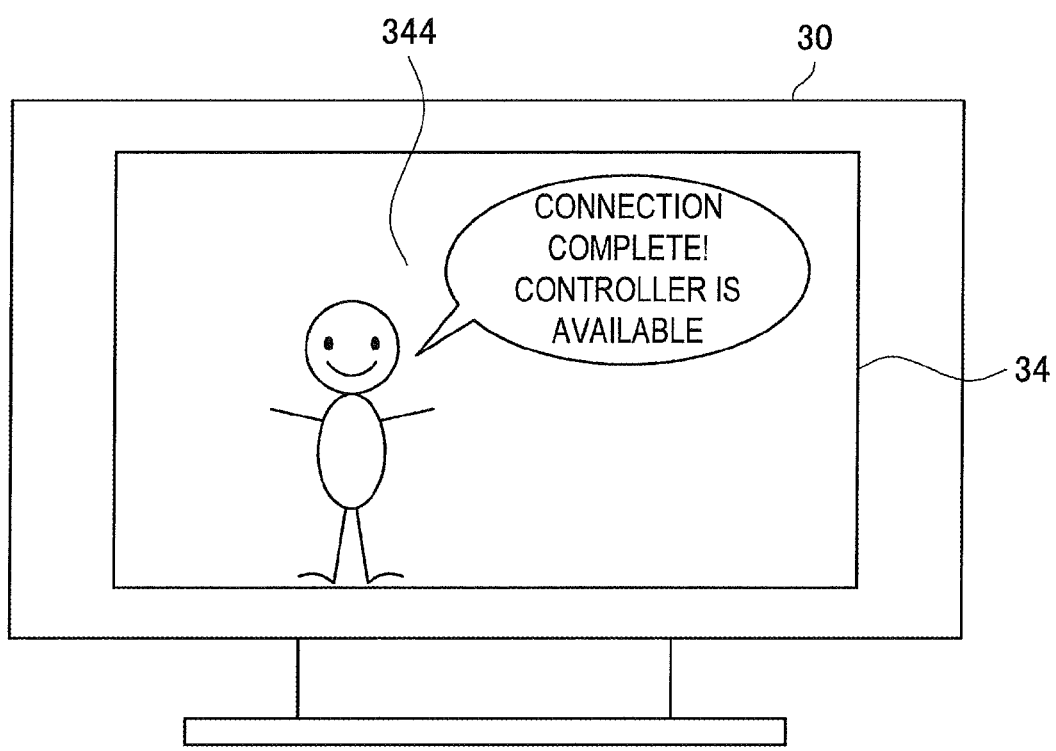
FIG. 16 is a diagram illustrating a screen display example illustrating a connection completion state according to the second embodiment.

Subsequently, in step S318, the home image display apparatus 30 indicates a connection completion state. Here, FIG. 16 illustrates a screen display example illustrating the connection completion state according to the second embodiment. As illustrated in FIG. 16, the display unit 34 displays a screen 344 including a display, "Connection complete! Controller now available," and an image of an instructor. Subsequently, in step S320, the home image display apparatus 30 starts data communication with the portable terminal 20.

On the other hand, in step S412, the portable terminal 20 is in a waiting state for a result until the determination result is received from the home image display apparatus 30.

Subsequently, if the received determination result is "Authentication OK" in step S414, the process proceeds to step S416. Next, in step S416, the portable terminal 20 starts data communication with the home image display apparatus 30. In this case, the portable terminal 20 displays a screen corresponding to the determination result.

On the other hand, if the received determination result is "Authentication NG" in step S414, the process proceeds to step S418. Next, in step S418, the portable terminal 20 reports a connection failure state and a connection retrial guide to the user. Subsequently, the process proceeds to step S406.

The operation process of the authentication system according to the second embodiment has been described above. According to the authentication system of this embodiment, an information processing apparatus (for example, the home image display apparatus 30) capable of directly communicating with the portable terminal 20 can perform an authentication process by an intuitive operation without a complex operation such as a password input.

[2-4. Modified Example]

In the above-described second embodiment, authentication for continuing communication when the home image display apparatus 30 and the portable terminal 20 perform direct communication has been described. However, the authentication system according to the embodiment of the present disclosure may perform authentication in an application layer when the home image display apparatus 30 and the portable terminal 20 perform direct communication. Hereinafter, the case in which the authentication system according to the embodiment of the present disclosure is applied to authentication in the application layer will be described as the modified example with reference to FIG. 17.

Figure 17:
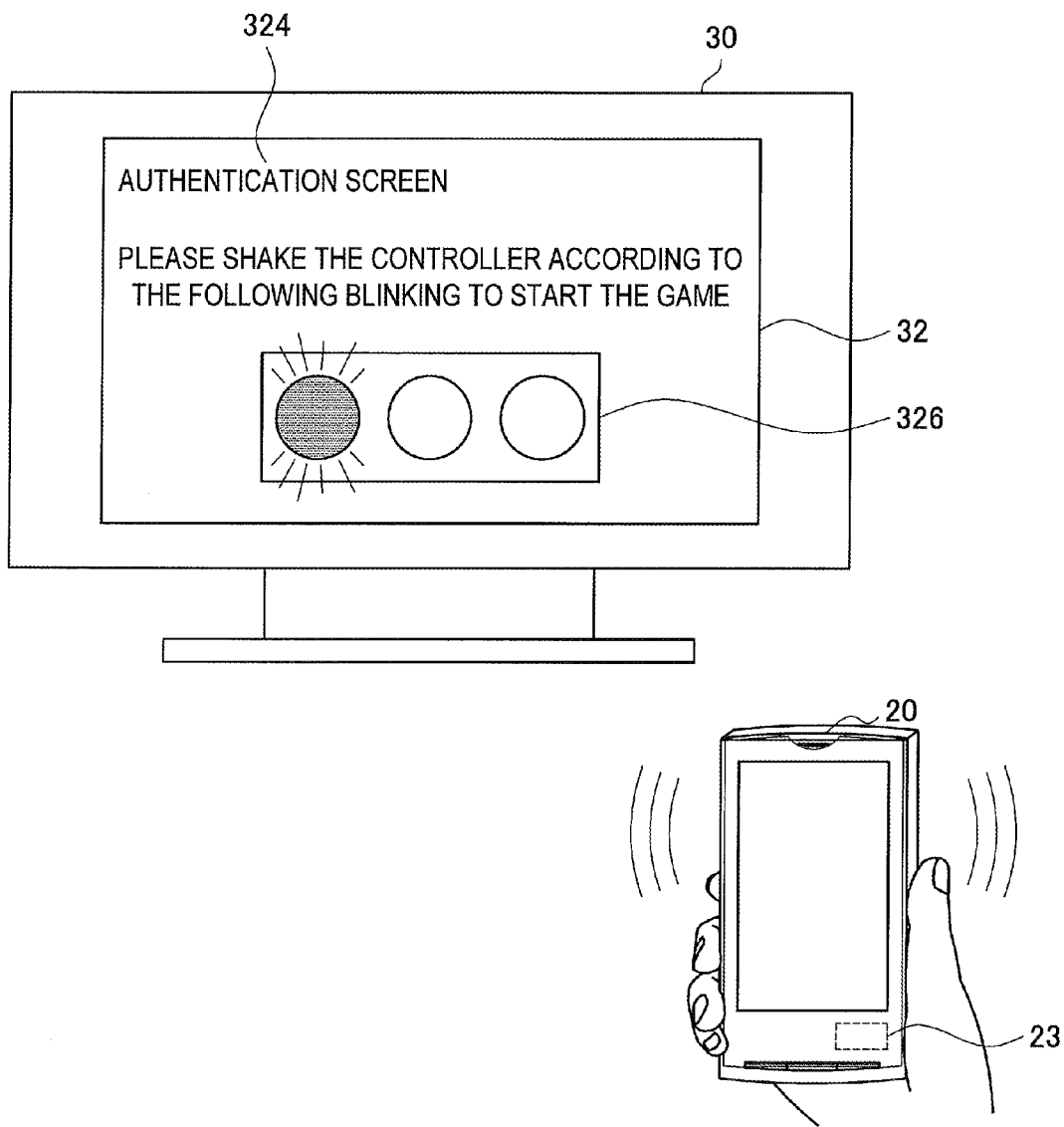
FIG. 17 is a diagram illustrating an overview of an authentication system according to a modified example of the present disclosure.

FIG. 17 is a diagram illustrating an overview of an authentication system according to the modified example of the present disclosure. As illustrated in FIG. 17, a home image display apparatus 30 and a portable terminal 20 are provided. When the two perform direct communication, the user shakes the portable terminal 20 according to an instruction 324 displayed on the display unit 32 of the home image display apparatus 30 and blinking of a blinking image 326. The home image display apparatus 30 receives data indicating the vibration detected by the portable terminal 20, compares the data to an operation pattern reported by the blinking image 326, and authenticates the portable terminal 20 and permits communication with the portable terminal 20 if a comparison result has satisfied a condition. According to the authentication system of the modified example as described above, a complex password input by the user is unnecessary and authentication by the application layer can be performed.

3. Summary

According to the authentication system related to the embodiment of the present disclosure as described above, a complex operation such as a password input is unnecessary and an authentication process can be performed by an intuitive operation.

It should be understood by those skilled in the art that various modifications, combinations, sub-combinations and alterations may occur depending on design requirements and other factors insofar as they are within the scope of the appended claims or the equivalents thereof.

For example, although the portable terminal 20 includes the analysis unit 24 to transmit an FFT result in the embodiments and the modified example described above, the present disclosure is not limited to the authentication process according to the embodiments and the modified example. The portable terminal 20 may transmit data indicating acceleration detected by the acceleration sensor 23 and the access point 10 or the home image display apparatus 30 may obtain an FFT result by analyzing the data indicating the acceleration.

In addition, although the access point 10 or the home image display apparatus 30 makes an authentication determination, for example, in the embodiments and the modified example described above, the present disclosure is not limited to the authentication determination according to the embodiments and the modified example. The portable terminal 20 may make the authentication determination, and report a determination result to the access point 10 or the home image display apparatus 30. In this case, the portable terminal 20 may pre-receive frequency data including a connection permission frequency and a connection permission threshold value from the access point 10 or the home image display apparatus 30.

In addition, although the information processing apparatus is implemented by the access point 10 or the home image display apparatus 30 in the embodiments and the modified example described above, the present disclosure is not limited thereto. For example, the information processing apparatus may be implemented by a portable terminal. Thereby, it is possible to apply the authentication system according to the embodiment of the present disclosure to an authentication process between portable terminals.

In addition, in the embodiments and the modified example described above, if a result of the authentication determination in the determination unit 17 (37) is NG, the connection permission frequency and the connection permission threshold value may be re-decided, and the LED blinking cycle may be reset, for example, by returning to step S104 illustrated in FIG. 4.

Additionally, the present technology may also be configured as below.

(1)

An information processing apparatus including:

a communication unit for communicating with another information processing apparatus; and a determination unit for determining whether or not to authenticate the other information processing apparatus on the basis of an operation pattern reported to a user and an analysis result of the user's operation corresponding to the operation pattern.

(2)

The information processing apparatus according to (1), wherein the operation pattern is a cycle of the user's operation.

(3)

The information processing apparatus according to (1) or (2), wherein the determination unit compares the operation pattern to the analysis result, and authenticates the other information processing apparatus if the analysis result has satisfied a condition.

(4)

The information processing apparatus according to any one of (1) to (3), wherein the determination unit compares a frequency indicating the operation pattern to a frequency indicating the analysis result, and authenticates the other information processing apparatus if a comparison result is within a threshold value.

(5)

The information processing apparatus according to any one of (1) to (4), wherein communication with the other information processing apparatus is continued if the determination unit determines to authenticate the other information processing apparatus.

(6)

The information processing apparatus according to any one of (1) to (4), wherein communication in an application layer with the other information processing apparatus is permitted if the determination unit determines to authenticate the other information processing apparatus.

(7)

The information processing apparatus according to any one of (1) to (6), including:

an analysis unit for analyzing a detection result of a sensor, which detects the user's operation corresponding to the operation pattern.

(8)

The information processing apparatus according to any one of (1) to (7), including:

an output unit for reporting the operation pattern to the user.

(9)

An information processing method including:

communicating with another information processing apparatus; and determining whether or not to authenticate the other information processing apparatus on the basis of an operation pattern reported to a user and an analysis result of the user's operation corresponding to the operation pattern.

(10)

A program for causing a computer to execute the processes of:

communicating with another information processing apparatus; and determining whether or not to authenticate the other information processing apparatus on the basis of an operation pattern reported to a user and an analysis result of the user's operation corresponding to the operation pattern.

(11)

The program according to (10), wherein the operation pattern is a cycle of the user's operation.

(12)

The program according to (10) or (11), wherein the determination process includes:

comparing the operation pattern to the analysis result; and authenticating the other information processing apparatus if the analysis result has satisfied a condition.

(13)

The program according to any one of (10) to (12), wherein the determination process includes:

comparing a frequency indicating the operation pattern to a frequency indicating the analysis result; and authenticating the other information processing apparatus if a comparison result is within a threshold value.

(14)

The program according to any one of (10) to (13), wherein communication with the other information processing apparatus is continued if the other information processing apparatus is determined to be authenticated by the determination process.

(15)

The program according to any one of (10) to (13), wherein communication in an application layer with the other information processing apparatus is permitted if the other information processing apparatus is determined to be authenticated by the determination process.

(16)

The program according to any one of (10) to (14), including the process of:

analyzing a detection result of a sensor, which detects the user's operation corresponding to the operation pattern.

(17)

The program according to any one of (10) to (16), including the process of:

reporting the operation pattern from an output unit to the user.

(18)

An information processing system including:
an information processing apparatus including
a communication unit for communicating with another information processing apparatus, and
a determination unit for determining whether or not to authenticate the other information processing apparatus on the basis of an operation pattern reported to a user and an analysis result of the user's operation corresponding to the operation pattern; and
the other information processing apparatus including
a communication unit for communicating with the information processing apparatus,
a sensor for detecting the user operation corresponding to the operation pattern, and
an analysis unit for analyzing a detection result of the sensor.

The present disclosure contains subject matter related to that disclosed in Japanese Priority Patent Application JP 2011-116602 filed in the Japan Patent Office on May 25, 2011, the entire content of which is hereby incorporated by reference.

What is claimed is:

1. An information processing apparatus comprising:
a communication unit configured to communicate with another information processing apparatus, wherein the another information processing apparatus is configured to output a variable signal having an operation pattern having at least one variable component to a user;
an analysis unit configured to analyze a detection result of a sensor, which is configured to detect a user's operation indicating acceleration of the information processing apparatus corresponding to the operation pattern; and
a determination unit configured to determine whether or not to authenticate the another information processing apparatus on the basis of the operation pattern output to the user and the detection result of the user's operation indicating that the acceleration of the information processing apparatus by the user substantially imitates the at least one variable component of the operation pattern,
wherein the at least one variable component of the operation pattern comprises a blinking cycle of at least one light emitting apparatus,
wherein the blinking cycle is set based on a connection permission frequency, and
wherein the communication unit, the analysis unit, and the determination unit are each implemented via at least one processor.

2. The information processing apparatus according to claim 1, wherein the determination unit is further configured to compare the operation pattern to the analysis result, and authenticate the another information processing apparatus if the analysis result has satisfied a condition.

3. The information processing apparatus according to claim 1, wherein the determination unit is further configured to compare a frequency indicating the operation pattern to a frequency of the responsive variable input of the user's operation indicating the analysis result, and authenticate the another information processing apparatus if a comparison result is within a threshold value.

4. The information processing apparatus according to claim 1, wherein communication with the another information processing apparatus is continued if the determination unit determines to authenticate the another information processing apparatus.

5. The information processing apparatus according to claim 1, wherein communication in an application layer with the another information processing apparatus is permitted if the determination unit determines to authenticate the another information processing apparatus.

6. The information processing apparatus according to claim 1, comprising:
an output unit configured to report the operation pattern to the user,
wherein the output unit is implemented via the at least one processor.

7. The information processing apparatus of claim 1, wherein the another information processing apparatus comprises an access point.

8. The information processing apparatus of claim 1, wherein the another information processing apparatus comprises a home image display apparatus.

9. An information processing method, implemented via at least one processor, the method comprising:
communicating with another information processing apparatus to report a variable signal having an operation pattern having at least one variable component to a user;
analyzing a detection result of a sensor, which is configured to detect a user's operation indicating acceleration of an information processing apparatus corresponding to the operation pattern; and
determining whether or not to authenticate the other information processing apparatus on the basis of the operation pattern reported to the user and the detection result of the user's operation indicating that the acceleration of the information processing apparatus by the user substantially imitates the at least one variable component of the operation pattern,
wherein the at least one variable component of the operation pattern comprises a blinking cycle of at least one light emitting apparatus, and
wherein the blinking cycle is set based on a connection permission frequency.

10. A non-transitory computer-readable medium having embodied thereon a program, which when executed by a processor of a computer causes the processor to perform a method, the method comprising:
communicating with another information processing apparatus, wherein the another information processing apparatus outputs a variable signal having an operation pattern having at least one variable component to a user;
analyzing a detection result of a sensor, which is configured to detect a user's operation indicating acceleration of an information processing apparatus corresponding to the operation pattern; and
determining whether or not to authenticate the another information processing apparatus on the basis of the operation pattern output to the user and the detection result of the user's operation indicating that the acceleration of the information processing apparatus by the user substantially imitates the at least one variable component of the operation pattern,
wherein the at least one variable component of the operation pattern comprises a blinking cycle of at least one light emitting apparatus, and
wherein the blinking cycle is set based on a connection permission frequency.

11. The program according to claim 10, wherein the determination process includes:

comparing the operation pattern to the analysis result; and
authenticating the another information processing apparatus if the analysis result has satisfied a condition.

12. The program according to claim 10, wherein the determination process includes:
comparing a frequency indicating the operation pattern to a frequency of the responsive variable input of the user's operation indicating the analysis result; and
authenticating the another information processing apparatus if a comparison result is within a threshold value.

13. The program according to claim 10, wherein communication with the another information processing apparatus is continued if the another information processing apparatus is determined to be authenticated by the determination process.

14. The program according to claim 10, wherein communication in an application layer with the another information processing apparatus is permitted if the another information processing apparatus is determined to be authenticated by the determination process.

15. The program according to claim 10, comprising the process of:
reporting the operation pattern from an output unit to the user.

16. An information processing system comprising:
an information processing apparatus including
at least one first processor,
a communication unit for communicating with another information processing apparatus using the at least one first processor, wherein the another information processing apparatus is configured to output a variable signal having an operation pattern having at least one variable component to a user, and
a determination unit for determining whether or not to authenticate the another information processing apparatus on the basis of the operation pattern output reported to the user and a detection result of the user's operation indicating that an acceleration of the information processing apparatus by the user substantially imitates the at least one variable component of corresponding to the operation pattern using the at least one first processor; and
the another information processing apparatus including
at least one second processor,
a communication unit for communicating with the information processing apparatus using the at least one second processor,
a sensor for detecting the user operation corresponding to the operation pattern using the at least one second processor, and
an analysis unit for analyzing a detection result of the sensor using the at least one second processor,
wherein the at least one variable component of the operation pattern comprises a blinking cycle of at least one light emitting apparatus, and
wherein the blinking cycle is set based on a connection permission frequency.

* * * * *